No. 893,520. PATENTED JULY 14, 1908.
C. S. KEMPER.
FURROW OPENER.
APPLICATION FILED APR. 23, 1908.
2 SHEETS—SHEET 1.
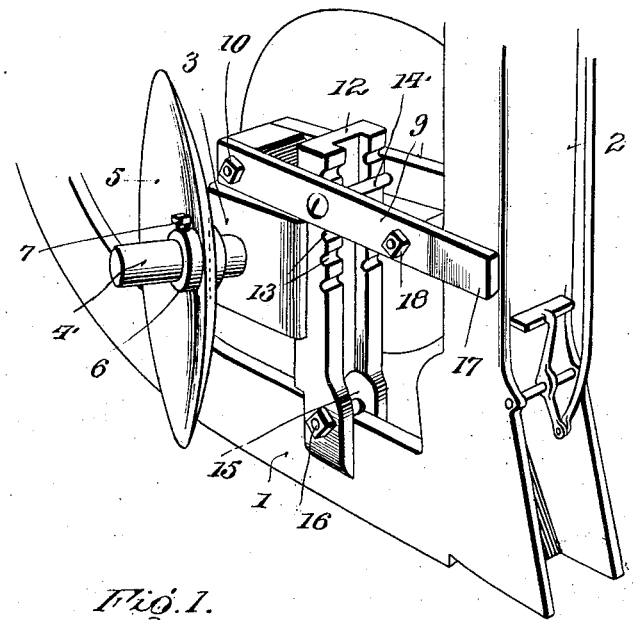
Fig. 1.
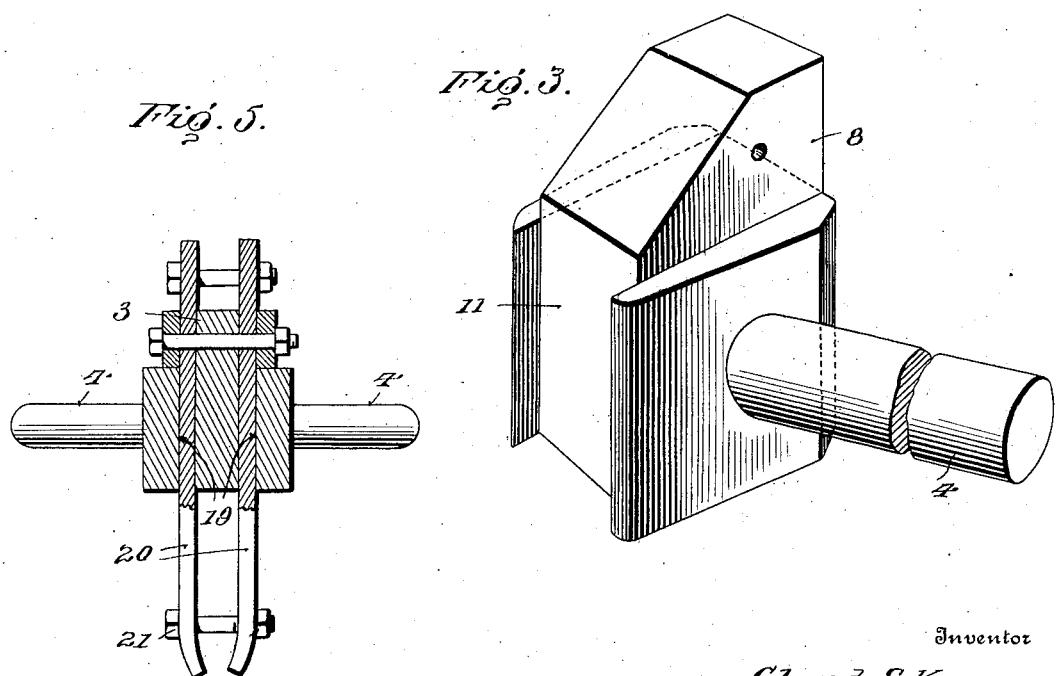
Fig. 5.
Fig. 3.
Witnesses
Inventor
Claude S. Kemper
By Dudley, Browne & Phelps.
Attorney No. 893,520.
PATENTED JULY 14, 1908.
C. S. KEMPER.
FURROW OPENER.
APPLICATION FILED APR. 23, 1908.
2 SHEETS—SHEET 2.
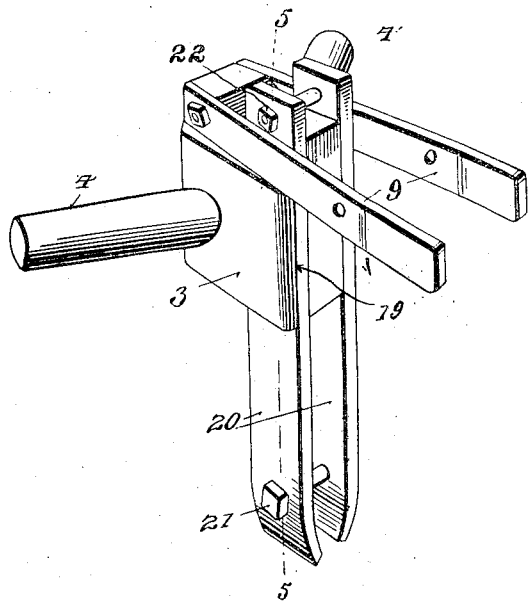
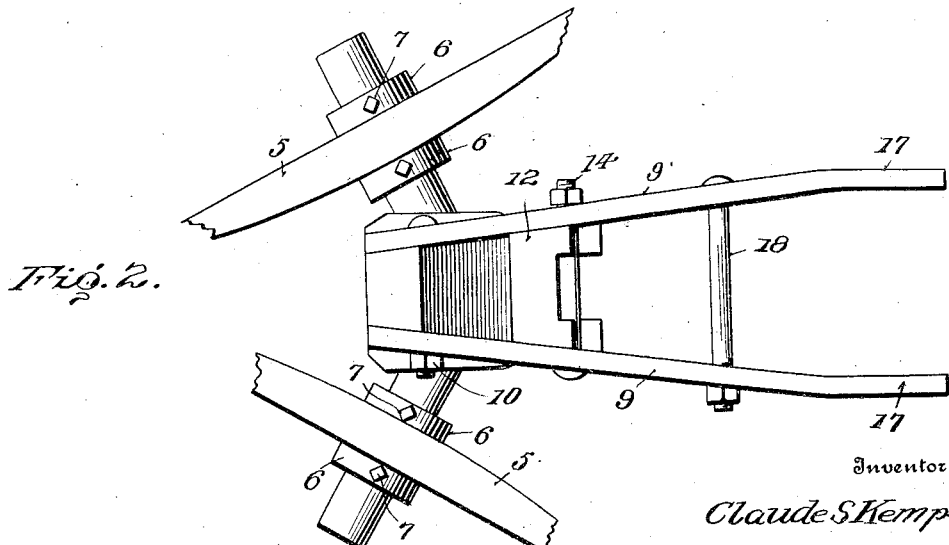

UNITED STATES PATENT OFFICE.

CLAUDE S. KEMPER, OF CAMERON, MISSOURI.

FURROW-OPENER.

No. 893,520.　　Specification of Letters Patent.　　Patented July 14, 1908.

Application filed April 23, 1908. Serial No. 428,768.

*To all whom it may concern:*

Be it known that I, CLAUDE S. KEMPER, citizen of the United States, residing at Cameron, in the county of Clinton and State of Missouri, have invented certain new and useful Improvements in Furrow-Openers, of which the following is a specification.

My invention relates to certain new and useful improvements in furrow opener attachments, and is an improvement upon the construction shown in Letters Patent No. 732,191 granted to me June 30, 1903.

The object of my invention is to simplify and cheapen the construction shown in my above mentioned patent without however sacrificing any of the advantages or adjustments thereof.

With these and other objects in view my invention consists in certain constructions, combinations and arrangements of parts, the preferred forms of which will be first described in connection with the accompanying drawings and then the invention particularly pointed out in the appended claims.

Referring to the drawings wherein the same part is designated by the same reference numeral wherever it occurs, Figure 1 is a perspective view of a furrow opener embodying one form of my improvements and showing the same as attached to the shoe of a corn planter; Fig. 2 is a plan view of the attachment removed from the planter; Fig. 3 is a perspective view of a portion of my improvement; Fig. 4 is a perspective view of a modification and Fig. 5 is a section on line 5—5 of Fig. 4.

1 designates the shoe of a corn planter to which my improved furrow opener is adapted to be attached.

2 is the seed tube at the heel of the shoe.

The shoe and heel may be of any desired construction, it being understood that my invention relates merely to the attachment, and that the principal object of my invention is to provide an attachment which, by reason of certain capabilities of adjustment render it adaptable to various types and sizes of planter shoes.

3 designates a block from which the stub axles 4, 4 extend laterally at an angle to the block. On these axles are mounted the disks 5. These disks may be adjustably secured on to the stub axles in any desired way, as for instance by the means disclosed in my prior patent above referred to, or by means of the pair of collars 6, 6, adapted to be secured on each side of the hub of the disk by set screws 7, 7. The particular means of securing the disk in position on the stub axle forms no part of the present invention. The upper end of the block 3 is preferably cut away to form a central projection 8 to the sides of which are secured the rearwardly projecting pair of arms 9, 9. As shown these arms are connected to the projecting portion 8 of the block 3 by means of the bolt 10 passing through the arms and the projection 8.

Referring to the form of construction shown in Figs. 1 to 3, the rear face of the block is provided with a vertical groove 11 adapted to receive a vertical standard 12. The upper end of the standard passes between the arms 9, 9 as shown. The rear face of the standard is preferably provided with notches 13 with any of which a bolt 14, carried in the arms 9, is adapted to engage to hold the standard in various positions of vertical adjustment. These notches are not however, essential, and they may be omitted and the standard held in adjusted position by the friction of the sides of the arms 9. At its lower end the standard is provided with a slot 15 adapted to engage the upper edge of the shoe 1, and 16 is a bolt passing through the sides of the slot against which the top of the shoe is adapted to rest and by means of which the sides of the standard can be drawn together so as to clamp the standard to the shoe.

As best shown in Fig. 2, the arms 9, 9, for almost their entire length diverge from each other. At their outer end, however, they are provided with the portions 17 which are parallel and which are adapted to engage the sides of the seed tube.

18 is a bolt passing through the arms 9 between the bolt 14 and the engaging portions 17. By means of this bolt the arms 9 can be drawn toward each other to cause them to firmly engage the sides of the seed tube.

In the form of construction shown in Figs. 4 and 5, the block 3 is provided with a pair of parallel slots 19 in its rear face, and the standard which engages the shoe is formed of a pair of bars 20 slidably mounted in slots 19, the bars being connected together at their lower ends by the bolt 21 by means of which the lower end of the standard may be secured to the shoe. The bars are connected together at their upper ends by the bolt 22, so that the bars may be secured in their adjusted position in the slots 19 by tightening the bolts 21—22 and also by the inner faces of the arms 9 engaging the sides of the bars 20.

From the above described construction it will be seen that I have produced a furrow opener attachment simple in construction, composed of few parts and which is adapted to be attached to different sizes and makes of shoes.

I claim:

1. A furrow opener attachment for planters and the like, comprising a block, disks mounted on the block, a pair of arms secured to the block and adapted to engage the sides of the seed tube of the planter, a standard adapted to engage the shoe of the planter, said standard passing between the two engaging arms, and means for adjustably securing the standard in various positions of vertical adjustment between the arms.

2. A furrow opener attachment for planters and the like, comprising a block, axle stubs extending angularly from the sides of the block, a pair of arms secured to the block and adapted to engage the sides of the seed tube of the planter, a standard adapted to frictionally engage the shoe of the planter, means for clamping the standard to the shoe, said standard passing between the two projecting arms, and means for adjustably securing the standard in various positions of vertical adjustment between the arms.

3. A furrow opener attachment for planters and the like, comprising a block, disks mounted on the block, a pair of arms secured to the block and adapted to engage the sides of the seed tube of the planter, a standard provided with notches in one side thereof, said standard being adapted to engage the shoe of the planter at one end with its other end passing between the two engaging arms, a bolt passing through the arms and adapted to engage the notches in the standard, whereby the standard may be secured in various positions of vertical adjustment between the arms.

In testimony whereof I affix my signature in presence of two witnesses.

CLAUDE S. KEMPER.

Witnesses:
 T. H. CARLTON,
 H. B. COOPER.